US012142073B2

(12) United States Patent
Naqvi et al.

(10) Patent No.: US 12,142,073 B2
(45) Date of Patent: Nov. 12, 2024

(54) FINGERPRINT-BASED DEVICE AUTHENTICATION

(71) Applicant: Capital One Services, LLC, McLean, VA (US)

(72) Inventors: Parvez Naqvi, Potomac, MD (US); Bhagyashree Prabhakar, Fairfax, VA (US); Anantha Swarma Kavi, Clarksburg, MD (US); Harsha Bilwani, Ashburn, VA (US); Haranath Santosh, Fairfax, VA (US); Suman Emudaboina Rajeshwar, Ashburn, VA (US); Adane Gebremeskel, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 393 days.

(21) Appl. No.: 17/241,823

(22) Filed: Apr. 27, 2021

(65) Prior Publication Data
US 2022/0343095 A1 Oct. 27, 2022

(51) Int. Cl.
G06K 9/00 (2022.01)
G06N 3/08 (2023.01)
G06V 40/12 (2022.01)
H04L 9/32 (2006.01)
H04L 9/40 (2022.01)
H04L 29/06 (2006.01)

(52) U.S. Cl.
CPC ........... *G06V 40/1365* (2022.01); *G06N 3/08* (2013.01); *H04L 9/3213* (2013.01); *H04L 9/3228* (2013.01); *H04L 9/3231* (2013.01); *H04L 63/1466* (2013.01)

(58) Field of Classification Search
CPC .... G06V 40/1365; G06N 3/08; H04L 9/3213; H04L 9/3228; H04L 9/3231; H04L 63/1466
See application file for complete search history.

(56) References Cited

U.S. PATENT DOCUMENTS

| 9,032,217 | B1* | 5/2015 | Brandwine | G06F 21/64 |
| | | | | 713/185 |
| 9,736,147 | B1* | 8/2017 | Mead | G06F 21/31 |
| 10,223,507 | B2* | 3/2019 | Kordik | G06F 11/302 |

(Continued)

Primary Examiner — Luu T Pham
Assistant Examiner — Paul J Skwierawski
(74) Attorney, Agent, or Firm — Banner & Witcoff, Ltd.

(57) ABSTRACT

Methods, systems, and apparatuses for device fingerprint-based authentication are provided herein. A computing device may receive, from a user device, authentication credentials and a first device fingerprint. The device fingerprint may be encrypted using a public/private key pair and may identify one or more aspects of the user device, such as operating parameters of the user device. Based on the authentication credentials, the computing device may authenticate the user device, store the first device fingerprint, and send a token to the user device. The computing device may receive a request for access to content. The request may comprise the token and a second device fingerprint. The second device fingerprint may be different from the first device fingerprint. Based on the token and comparing the first device fingerprint to the second device fingerprint, the computing device may determine whether to authenticate the device that sent the request.

19 Claims, 11 Drawing Sheets

(56) References Cited

U.S. PATENT DOCUMENTS

| | | | |
|---|---|---|---|
| 2006/0282660 A1* | 12/2006 | Varghese | G07F 7/1083 |
| | | | 713/155 |
| 2017/0093906 A1* | 3/2017 | Bhargav-Spantzel | ...................... |
| | | | H04L 9/3218 |
| 2020/0034663 A1* | 1/2020 | Michiels | G06F 11/10 |
| 2021/0075790 A1* | 3/2021 | Hebert | H04L 63/101 |
| 2021/0226927 A1* | 7/2021 | Crabtree | G06N 5/022 |
| 2021/0272117 A1* | 9/2021 | Ene | G06Q 20/409 |
| 2022/0141220 A1* | 5/2022 | Lind | H04L 63/0838 |
| | | | 726/1 |
| 2022/0200999 A1* | 6/2022 | Huang | H04L 9/30 |

\* cited by examiner

```
function generate_fingerprint() {
  var pubKey = pemToArrayBuffer(sessionStorage.getItem("publicKey") , "-----BEGIN PUBLIC KEY-----" , "-----END PUBLIC KEY-----");

window.crypto.subtle.importKey(
    "spki",
    pubKey,
    signAlgorithm,
    true,
    ["verify"]
  ).then(function(importedPubKey) {
    window.crypto.subtle.exportKey(
        "jwk",
        importedPubKey
      ).then(function(keyData) {
        fingerprintdata = str2ab(generate_fingerprint_header(keyData) + "." + generate_fingerprint_body());
          var privKey = pemToArrayBuffer(sessionStorage.getItem("privateKey"), "-----BEGIN RSA PRIVATE KEY-----", "-----END RSA PRIVATE KEY-----");
            window.crypto.subtle.importKey(
              "pkcs8",
              privKey,
              signAlgorithm,
              true,
              ["sign"]
            ).then(function(importPrivkey) {
              crypto.subtle.sign(signAlgorithm, importPrivkey, window.fingerprintdata)
                .then(function(signature){
                  var signed_fingerprint = str2ab(generate_fingerprint_header(keyData) + "." + generate_fingerprint_body_test());
                })
                .catch(function(err){
                  console.error(err);
                });
            }).catch(function(err) {
              console.log(err);
            });
      }).catch(function(err) {
        console.log(err);
      });
  }).catch(function(err) {
    console.log(err);
  });
}
```

FIG. 7A

```
function generate_jwt_header(keydata) {
  var obj = new Object();
  obj.typ = "JWT";
  obj.alg = "RS";
  obj.jwk = keydata;
  return JSON.stringify(obj);
} function generate_jwt_body(host) {
  var obj = new Object();
  obj.jti="-BwC3ESc6acc2ITc";
  obj.htm="POST";
  obj.htu="https://guest1.example.com/token";
  obj.iat=1562262616;
  return JSON.stringify(obj);
} function removeLines(str) {
   return str.replace("\n", "");
} function base64ToArrayBuffer(b64) {
   var byteString = window.atob(b64);
   var byteArray = new Uint8Array(byteString.length);
   for(var i=0; i < byteString.length; i++) {
      byteArray[i] = byteString.charCodeAt(i);
   }
   return byteArray;
} function pemToArrayBuffer(pem , prefix, suffix) {
   var b64Lines = removeLines(pem);
   var b64Prefix = b64Lines.replace(prefix, ");
   var b64Final = b64Prefix.replace(suffix, ");

return base64ToArrayBuffer(b64Final);
}
```

FIG. 7B

```
function ab2str(buf) {
 return String.fromCharCode.apply(null, new Uint16Array(buf));
} function str2ab(str) {
 var buf = new ArrayBuffer(str.length*2); // 2 bytes for each char
 var bufView = new Uint16Array(buf);
 for (var i=0, strLen=str.length; i < strLen; i++) {
   bufView[i] = str.charCodeAt(i);
 }
 return buf;
} var signAlgorithm = {
    name: "RSASSA-PKCS1-v1_5",
    hash: {
      name: "SHA-256"
    },
    modulusLength: 2048,
    extractable: true,
    publicExponent: new Uint8Array([1, 0, 1])
  }
var jwtdata;
```

FIG. 7C

```
function generateKeys() { const getKeys = async () => {
    const options = {
      name: "RSASSA-PKCS1-v1_5",
      hash: {
        name: "SHA-256"
      },
      modulusLength: 2048,
      extractable: true,
      publicExponent: new Uint8Array([1, 0, 1])
    } const keys = await window.crypto.subtle.generateKey(
      options,
      true, // non-exportable (public key still exportable)
      ['sign', 'verify'],
    );

const publicKey = await window.crypto.subtle.exportKey('spki', keys.publicKey);
    let pubbody = window.btoa(String.fromCharCode(...new Uint8Array(publicKey)));
    pubbody = pubbody.match(/.{1,64}/g).join('\n');
    pubKey = `-----BEGIN PUBLIC KEY-----\n${pubbody}\n-----END PUBLIC KEY-----`;

const privateKey = await window.crypto.subtle.exportKey('pkcs8', keys.privateKey);

let privbody = window.btoa(String.fromCharCode(...new Uint8Array(privateKey)));
    privbody = privbody.match(/.{1,64}/g).join('\n');
    privKey = `-----BEGIN RSA PRIVATE KEY-----\n${privbody}\n-----END RSA PRIVATE KEY-----`;

};

getKeys().then(function(){
    sessionStorage.setItem("publicKey",pubKey);
    sessionStorage.setItem("privateKey",privKey);
  });

FINGERPRINT-BASED DEVICE AUTHENTICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to computer security. More specifically, aspects of the disclosure may provide for the prevention of session replay attacks by using device fingerprints to identify computing devices.

BACKGROUND

A replay attack, also known as a session replay attack or playback attack, is a form of network attack which repeats validly transmitted data to gain unauthorized access to content. For example, a nefarious computing device, sometimes referred to as a man-in-the-middle, might monitor network traffic and may identify a token (e.g., a cookie, or other similar data element) that has been transmitted as part of an authentication process. Once the token has been pilfered by the nefarious computing device, the nefarious computing device may re-transmit the token to the content source, in effect pretending to be the authenticated device. In practice, this may allow the nefarious computing device to gain unauthorized access to the content source, even if the nefarious computing device does not have access to the authentication credentials used for the original authentication process.

Modern approaches to preventing replay attacks are often ill-equipped to prevent more advanced forms of replay attacks. Some authentication systems use one-time-use passwords to authenticate a session, but such one-time-use passwords can be extremely cumbersome for users, particularly since the passwords often expire after very short periods of time and might need to be re-entered periodically. Synchronization methods, like causing the content source and the authenticated device to periodically exchange timestamps to determine device authenticity based on the time difference between the two devices, can be undesirably convoluted and ineffective, especially since modern computing devices can be sufficiently speedy so as to accurately mimic an authenticated device. Moreover, while some systems encrypt tokens using a public/private key pair in an attempt to improve the overall security of network communications, this does not prevent replay attacks: a nefarious computing device need not know the contents of an encrypted token to re-transmit it.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for authenticating access to content based on device fingerprints. This may have the effect of improving the security of users of the Internet by preventing replay attacks. According to some aspects, these and other benefits may be achieved by receiving and storing a device fingerprint corresponding to a user device during authentication of that device, then authenticating subsequent requests from computing devices based on whether those computing devices present a device fingerprint corresponding to the stored device fingerprint. As will be described in further detail herein, this use of device fingerprints may prevent unauthorized devices from using session tokens (e.g., tokens generated after successful authentication of a device) to gain unauthorized access to computing resources.

More particularly, a server may receive, from a user device, authentication credentials, such as a username and/or password. The server may also receive a first device fingerprint that uniquely identifies the user device. For example, the server may transmit, to the user device, a script configured to cause the user device to generate the first device fingerprint, and the first device fingerprint may have been generated, by the user device, by executing the script. Based on authenticating the authentication credentials, the server may send, to the user device, a token based on the authentication credentials, and may store, in a database, the first device fingerprint. The server may receive (e.g., at a later time) a request for access to content. That request may comprise the token and a second device fingerprint. The second device fingerprint need not be the same as the first device fingerprint, and may indicate a change in at least one operating parameter of the user device. For example, the first device fingerprint may indicate a first state (e.g., a first network used by, a processing level of, an operating system used by) of the user device at a first time, and the second device fingerprint may indicate a second state of the user device at a second time. The server may compare the first device fingerprint with the second device fingerprint to determine whether the request for access to the content was received from the user device (as compared to, for example, a potential man-in-the-middle attacker). For example, comparing the first device fingerprint with the first device fingerprint may comprise determining a difference between the first device fingerprint and the second device fingerprint, then determining that the difference corresponds to a change in the user device. As another example, a machine learning model may be trained, using a history of device fingerprint changes, to detect unexpected device fingerprint changes, and comparing the first device fingerprint with the second device fingerprint may be based on output, from the machine learning model, that is based on the second device fingerprint. Based on authenticating the token and based on whether the request for access to the content was received from the user device, the server may determine whether to provide access to the content. For example, a difference between the first device fingerprint and the second device fingerprint may indicate that the request for access to the content was received from a second user device (e.g., an unauthorized device, such as a man-in-the-middle), such that the server may prevent the second user device from accessing the content. As another example, determining whether to provide access to the content may comprise comparing a processing power of the user device to a cryptographic strength of the second device fingerprint and/or determining a security level of the content.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7A shows illustrative code for a function that generates a fingerprint.

FIG. 7B shows illustrative code for functions which may be called as part of the function shown in FIG. 7A.

FIG. 7C shows illustrative code for functions which may be called as part of the function shown in FIG. 7A.

FIG. 7D shows illustrative code for a function that generates public and private keys.

DETAILED DESCRIPTION

Figure 1:
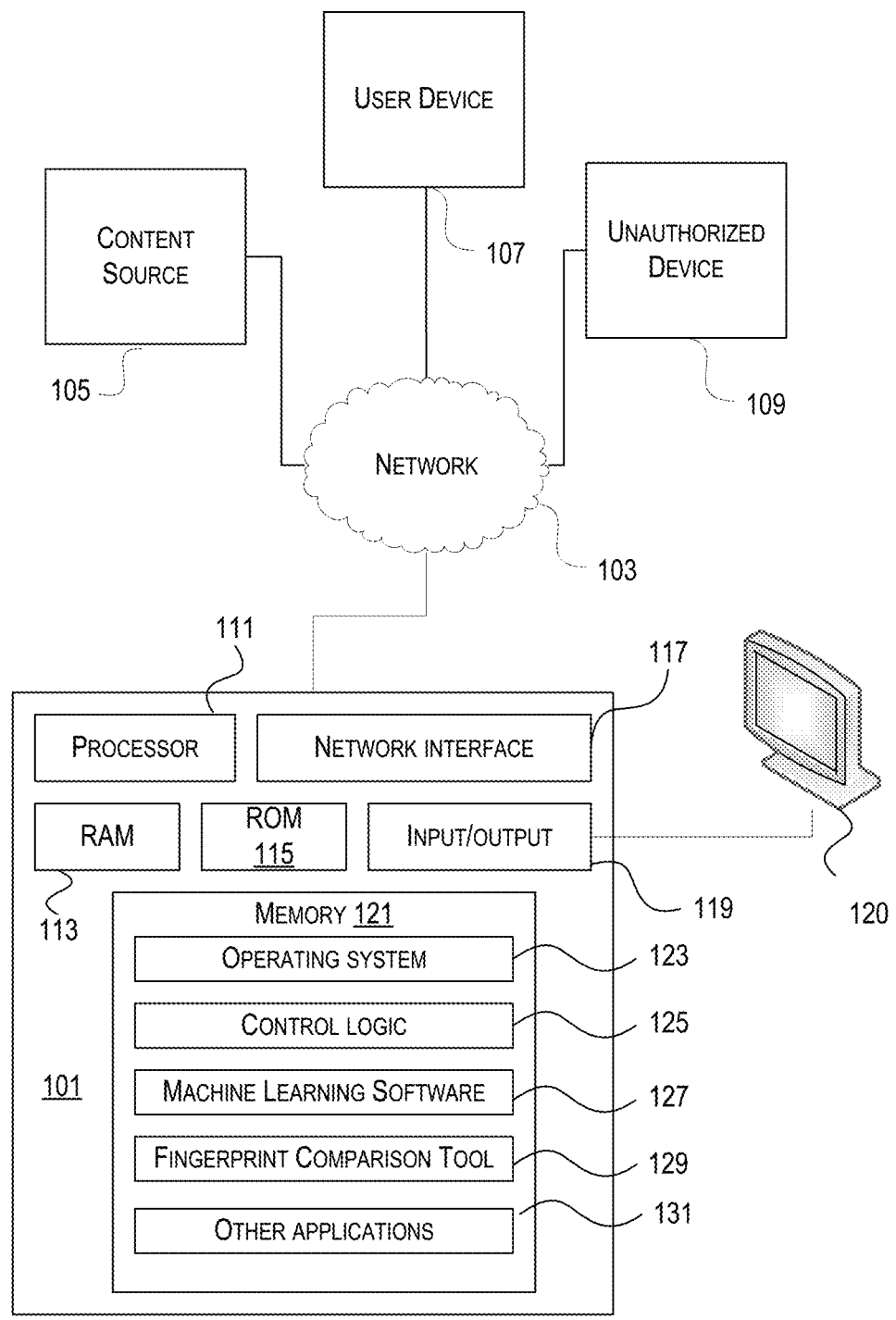
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for authenticating computing devices. As discussed further herein, this combination of features may allow computing devices to subsequently authenticate themselves using session tokens in a manner which is protected from replay attacks (e.g., man-in-the-middle attacks). As a simple example, the features discussed herein may cause computing devices to use device fingerprints as part of session token-based authentication, thereby preventing unauthorized devices from re-transmitting captured session tokens to gain unauthorized access to computing resources.

Aspects described herein may improve the functioning of computers by improving the security of computer communications. Many network communications (e.g., communications associated with subscription services, communications associated with financial transactions, and the like) rely on the privacy and security of transmissions. Replay attacks, like man-in-the-middle spoofing of captured session tokens, impact the privacy and security of those transactions. For example, by spoofing a captured authentication token and re-transmitting the captured token to a server, a nefarious user might gain access to a banking website, medical records, or the like. To prevent such unauthorized access, aspects described herein use device fingerprints to validate that the same computing device uses the same session token over time, even if the computing device changes in one or more ways (e.g., in terms of available processing power, network bandwidth, hard drive space, operating system version, or the like). The steps described herein must necessarily be performed by computers, as the steps are part of a computer-driven communications and authentication process which has no analogue in conventional human communications. For example, the problem of man-in-the-middle monitoring of electronic communications, such as wired or wireless transmissions, is rooted in the concept of computing communications. As such, the methods described herein have no human analogue, and are a computer-driven improvement to the method in which computers communicate.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes (e.g., the computing device 101, a content source 105, a user device 107, and/or an unauthorized device 109) may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. The computing device 101, the content source 105, the user device 107, the unauthorized device 109, and/or other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. The processor 111 may include one or more computer processing units (CPUs), graphical processing units (GPUs), and/or other processing units such as a processor adapted to perform computations associated with machine learning. The I/O 119 may include a variety of interface units and drives for reading, writing, displaying, and/or printing data or files. I/O 119 may be coupled with a display such as display 120. The memory 121 may store software for configuring computing device 101 into a special purpose computing device in order to perform one or more of the various functions discussed herein. The memory 121 may store operating system software 123 for controlling overall operation of computing device 101, control logic 125 for instructing computing device 101 to perform aspects discussed herein, machine learning software 127, a fingerprint comparison tool 129, and other applications 131. Control logic 125 may be incorporated in and may be a part of machine learning software 127, the fingerprint comparison tool 129, and/or the other applications 131. In other embodiments, computing device 101 may include two or more of any and/or all of these components (e.g., two or more processors, two or more memories, etc.) and/or other components and/or subsystems not illustrated here.

The content source 105 may be a source of content, such as one or more web pages, television shows, movies, bank account information, or the like. As will be discussed in further detail below, the content stored by the content source 105 may be secure or otherwise private, such that authentication may be required to access content stored by the content source 105. Such authorization may be managed by another device, such as the computing device 101. In other words, though content might be stored on the content source 105, the computing device 101 (or another similar computing device that does not store the content) might prevent the user device 107 and/or the unauthorized device 109 from accessing the content.

The user device 107 and/or the unauthorized device 109 are examples of computing devices which may be the same or similar as the computing device 101. As such, the user device 107 and/or the unauthorized device 109 may, like the computing device 101, comprise a processor, RAM, ROM, network interface(s), and the like. The user device 107 and the unauthorized device 109 may be the same or similar devices, and the use of the term unauthorized with respect to the unauthorized device 109 is merely for the purposes of illustration later in this disclosure. In particular, the unauthorized device 109 is used as an example of a device which may be identical to the user device 107 (e.g., both may be smartphones, laptops, or the like), but which might be used by a malicious individual to attempt to steal and use authentication credentials associated with the user device 107.

The content source 105, the user device 107, the unauthorized device 109, and/or other devices (not shown) may have similar or different architecture as described with respect to computing device 101. Those of skill in the art will appreciate that the functionality of computing device 101 (or content source 105, the user device 107, and/or the unauthorized device 109) as described herein may be spread across multiple data processing devices, for example, to distribute processing load across multiple computers, to segregate transactions based on geographic location, user access level, quality of service (QoS), etc. For example, the computing device 101, the content source 105, the user device 107, the unauthorized device 109, and/or other devices (not shown) may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a summary of the problem of replay attacks.

Figure 2:
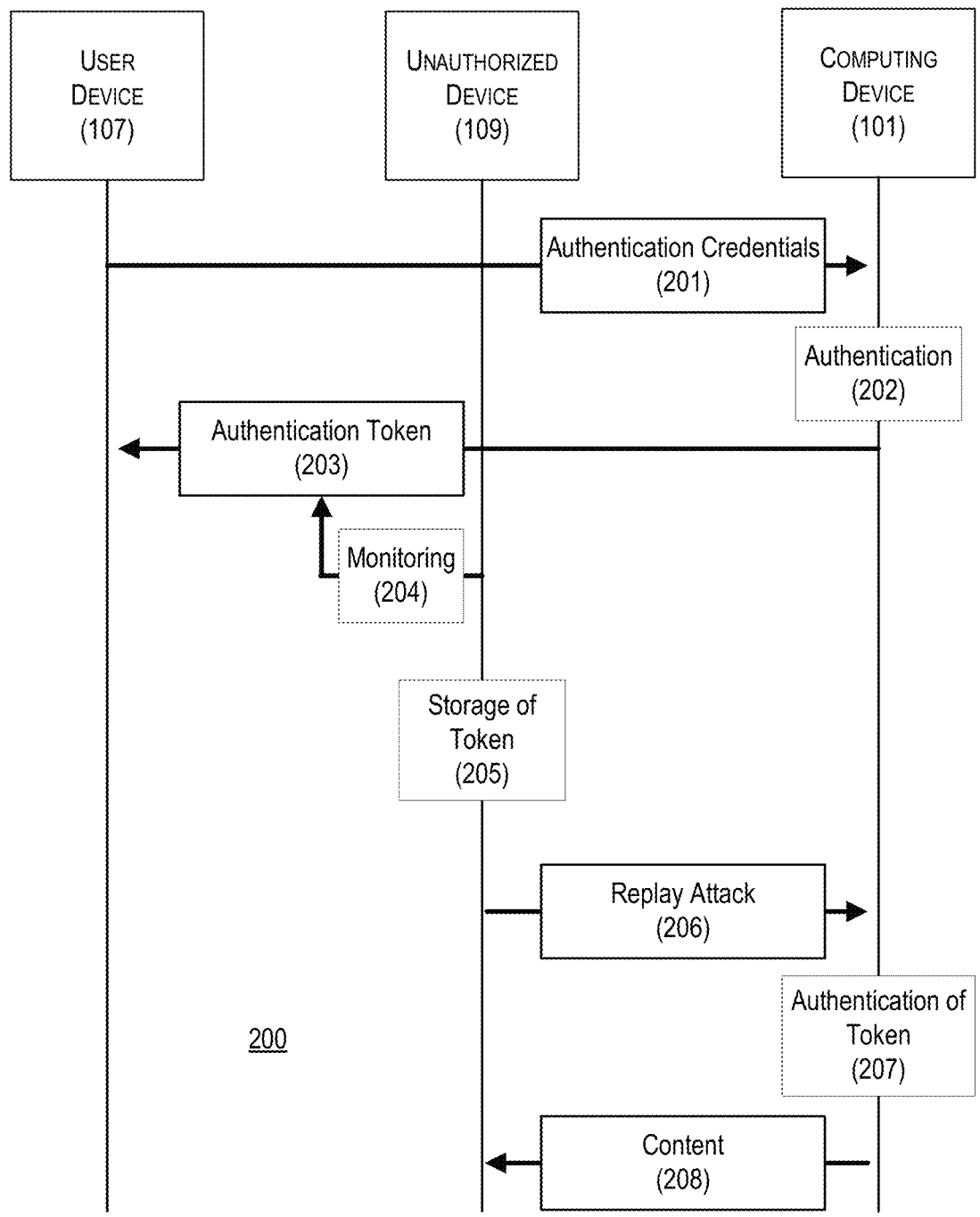
FIG. 2 depicts a message diagram showing a replay attack.

FIG. 2 is a message flow 200 between the user device 107, the unauthorized device 109, and the computing device 101. The message flow 200 illustrates a replay attack. The message flow 200 is merely an example of how a replay attack might occur, and illustrates how conventional authentication systems might be vulnerable to replay attacks. FIG. 2 may be placed in contrast to FIG. 3, discussed below, which shows how aspects described herein might prevent such replay attacks.

The steps shown in FIG. 2 may be rearranged. For example, though step 204 depicts monitoring as occurring sometime after authentication in step 203, the steps may be performed at the same time (and, in general, the monitoring depicted in step 204 might be continual).

In step 201, the user device 107 may send the computing device 101 authentication credentials. Authentication credentials may comprise, for example, a username, a password, a one-time-use password (e.g., as generated using a mobile app), an alphanumeric code (e.g., a PIN number), or the like. The authentication credentials might be transmitted, e.g., over the network 103, and might be transmitted as part of a log-in process. For example, the authentication credentials may be transmitted as part of a user of the user device 107 logging into the computing device 101 via a web page form on a web browser application.

In step 202, the computing device 101 may authenticate the user device 107 based on the authentication credentials received in step 201. The authentication process in step 202 may depend on, among other considerations, the level of security of the content in question, the authentication credentials received, and the like. As part of the authentication process in step 202, the computing device 101 may determine whether the user device 107 is authorized to access content (e.g., as stored on the computing device 101 and/or as stored by the content source 105). The authentication process may comprise instantiating a session for the user device 107. As part of instantiating such a session, data may be stored by the computing device 101 relating to the user device 107. For example, the authentication credentials received in step 201 may be stored, and/or a unique session identifier may be stored.

In step 203, and based on the authentication in step 202, the computing device 101 may grant access to the user device 107 by providing the user device 107 a token. The token sent to the user device 107 may enable the user device 107 to request content from the computing device 101 without re-transmission of the authentication credentials. Such a token may comprise, for example, a cookie to be stored in a web browser application executing on the user device 107. That said, a particular data structure is not required, and the token provided to the user device 107 may comprise any form of content which may enable the user device 107 to access the computing device 101 without re-transmission of the authentication credentials. Granting access to the user device 107 may be contingent on successful authentication in step 203. Granting access to the user device 107 may additionally and/or alternatively comprise sending content (e.g., a web page indicating that the user device 107 has logged in).

In step 204, the unauthorized device 109 may monitor, and thereby capture, the token transmitted in step 203. Such monitoring may be undesirable in that it may be performed by a party to, in effect, steal the token transmitted in step 203. Such monitoring may be performed in a number of different ways. For example, if the user device 107 transmits the token to the computing device 101 via a wired network, then the unauthorized device 109 may monitor transmissions and acquire the token by tapping a line between the user device 107 and the computing device 101. As another example, if the user device 107 transmits the token to the computing device 101 via a wireless network, then the unauthorized device 109 may monitor transmissions and acquire the token by monitoring wireless communications near the user device 107 and/or the computing device 101. Monitoring may additionally and/or alternatively comprise filtering and/or sifting through transmissions to identify tokens amongst other transmissions. For example, a significant number of messages may be sent between the user device 107 and the computing device 101, such that finding the token amongst the messages might require the unauthorized device 109 to filter through and/or otherwise process the messages.

Given the nature of many networks, it may be prohibitively difficult for the computing device 101 and/or the user device 107 to detect when the unauthorized device 109 is monitoring network transmissions. Indeed, for many networks (particularly wireless networks, where transmissions might be surreptitiously monitored from a nearby room or building), the monitoring might be largely undetectable. This can pose a significant security problem: because the unauthorized device 109 might be monitoring transmissions between the user device 107 and the computing device 101 without either device's knowledge, the unauthorized device 109 may be capable of tricking the computing device 101 into believing that the unauthorized device 109 is the user device 107. Such a circumstance is illustrated in the subsequent steps discussed below.

In step 205, and based on the monitoring in step 202, the unauthorized device 109 may store the token. Step 205 illustrates that the unauthorized device 109 now has access to a token, intended for the user device 107, which it may use for unauthorized purposes (e.g., gaining access to the computing device 101). This is an undesirable result from a network security perspective.

In step 206, the unauthorized device 109 may conduct a replay attack on the computing device 101. A replay attack may comprise the unauthorized device 109 transmitting (e.g., re-transmitting) the token (e.g., the token transmitted in step 203, monitored in step 204, and stored in step 205) to the computing device 101. As such, in a replay attack, the unauthorized device 109 may act as if it is the user device 107 by re-transmitting a token associated with the user device 107. As part of the replay attack, the unauthorized device 109 may send other data associated with the user device 107, such as packet headers configured to appear similar to previous packet headers transmitted by the user device 107.

In step 207, the computing device 101 may determine whether to authenticate the unauthorized device 109 based on the token it received as part of the replay attack in step 206. Should the replay attack in step 206 be successful, the computing device 101 may successfully authenticate the unauthorized device 109 as if it was the user device 107. In contrast, should the replay attack in step 260 not be successful, the computing device 101 might not authenticate the unauthorized device 109.

In step 208, based on the authentication in step 208, the computing device 101 may transmit content to the unauthorized device 109. The content might be, for example, a web page (e.g., a banking website page), media content (e.g., music or a television show), or the like. This result may be undesirable: after all, the unauthorized device 109 in FIG. 2 gains access to content that it is likely not authorized to gain access to.

As a summary of FIG. 2, an unauthorized device, such as the unauthorized device 109, may nefariously capture and re-transmit a token, intended for another device, to gain access to computing resources. Such a replay attack does not require that the unauthorized device possess authentication credentials, but instead leverages vulnerabilities in computer networks.

Discussion will now turn to use of device fingerprints to prevent the sort of replay attacks depicted in FIG. 2. As will be detailed below, use of device fingerprints during the authentication process may advantageously prevent precisely the kind of replay attack depicted in FIG. 2.

Figure 3:
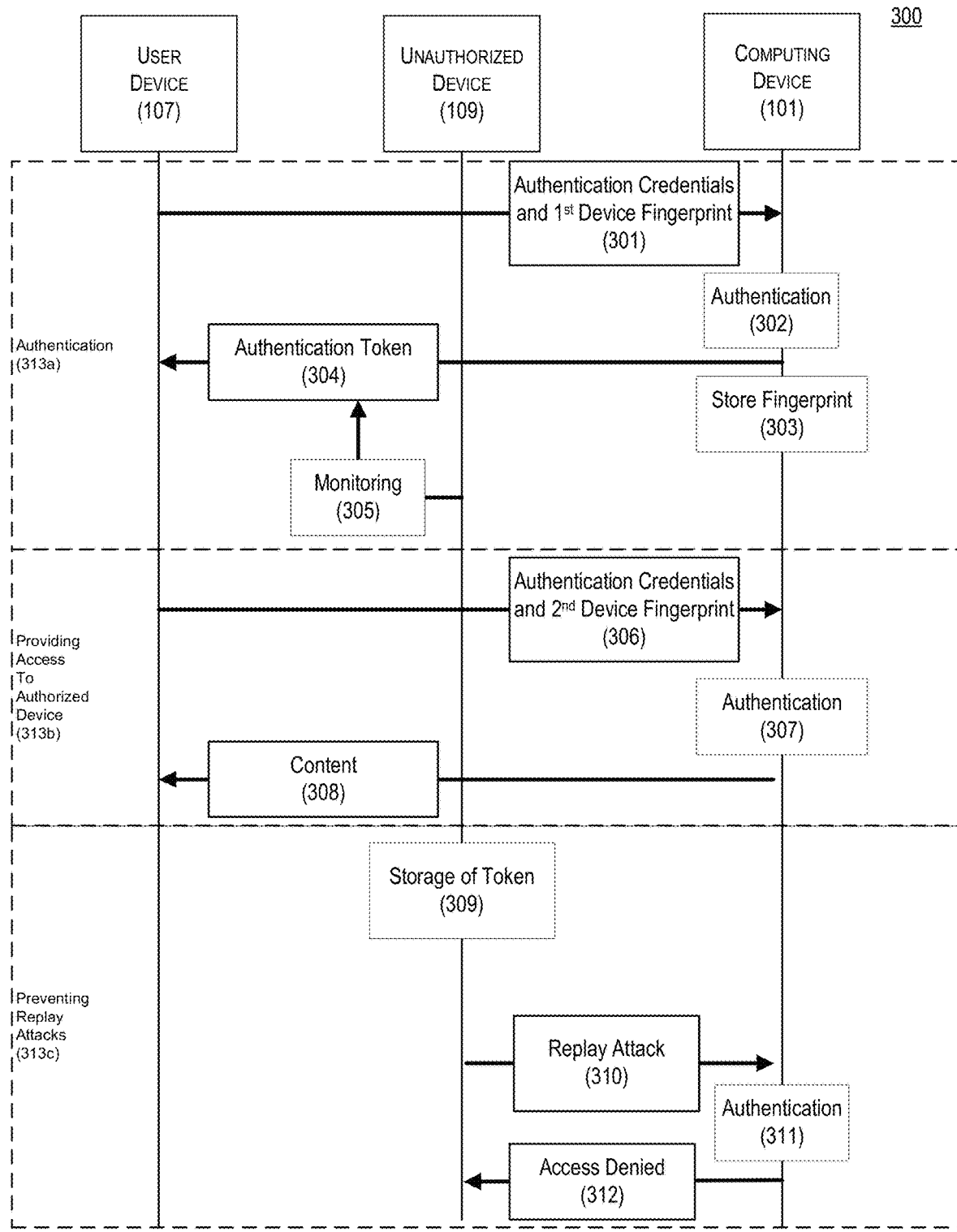
FIG. 3 depicts a message diagram showing device authentication using fingerprints in a manner which prevents access by an unauthorized device.

FIG. 3 depicts a messaging diagram 300 between the user device 107, the unauthorized device 109, and the computing device 101 where replay attacks are prevented by using device fingerprints. For the purposes of discussion, the message diagram 300 of FIG. 3 is divided into three parts: a first part 313*a* associated with authentication of the user device 107, a second part 313*b* associated with providing access to the authorized user device 107, and a third part 313*c* associated with preventing replay attacks.

The steps shown in FIG. 3 may be rearranged. For example, though step 303 depicts storing a fingerprint sometime around when access is granted in step 304, the steps may be performed at different times. As yet another example, the storage of the token in step 309 may be performed at any time after the token is monitored in step 305, such that it need not occur after step 306, step 307, and/or step 308.

In step 301, the user device 107 may transmit, to the computing device, authentication credentials and a first device fingerprint. The transmission of the authentication credentials may be the same or similar as described with step 201 of FIG. 2. Along with the authentication credentials, a first device fingerprint may be transmitted by the user device 107 and to the computing device 101.

A device fingerprint, such as the first device fingerprint, may be any indicator of a computing device, such as the user device 107. A device fingerprint may be, for example, a cryptographic hash that uniquely identifies one or more operating parameters of a computing device. A device fingerprint may additionally and/or alternatively be, for example, a unique alphanumeric string that is comprised of one or more aspects of a computing device, such as a unique serial number, Media Access Control (MAC) address, operating system serial number, or the like. The device fingerprint may indicate the status of a computing device at a particular period of time. For example, the device fingerprint might indicate one or more operating parameters of a device at a certain point of time. Examples of device fingerprints are provided below with respect to FIG. 6.

As part of transmitting the first device fingerprint, the user device 107 may generate a public and private key pair. The private key may be stored on the user device 107, whereas the public key may be transmitted along with the first device fingerprint. The first device fingerprint may be encrypted based on the private key. By encrypting the device fingerprints using the private key and enabling the computing device 101 to decrypt the device fingerprints using the public key, the security of the device fingerprints may be significantly improved. This may advantageously prevent, for example, the unauthorized device 109 from guessing the format and/or content of a device fingerprint. For instance, if the device fingerprint only contains a select number of operating parameters of a computing device, it might be possible for the unauthorized device 109 to brute-force the operating parameters to generate a device fingerprint that appears legitimate unless the device fingerprints are encrypted with a private key unavailable to the unauthorized device 109.

The device fingerprint might be generated by the user device 107 by executing a script. The script may be received from the computing device 101. For example, prior to step 301, the user device 107 may receive, from the computing device 101, a script that causes the user device 107 to generate one or more device fingerprints. The script might be executed in a web browser application executing on the user device 107.

In step 302, the computing device 101 may authenticate the user device 107 based on the authentication credentials. The authentication in step 302 may be the same or similar as the authentication in step 202 of FIG. 2. The authentication process of step 302 might, but need not, entail analysis of the first device fingerprint. For example, the first device fingerprint might be used during the authentication process to determine whether the user device 107 is authorized to use the authorization credentials. In such a circumstance, unexpected computing devices (e.g., entirely new devices with unfamiliar operating parameters) might be prevented from using authorization credentials associated with other computing devices. As another example, the authentication may be performed based merely on the authentication credentials.

In step 303, the computing device 101 may store the first device fingerprint. The computing device 101 may store the first device fingerprint based on successful authentication of the user device 107 in step 302. The first device fingerprint may be stored in a database, such as a database stored in the memory 121 and/or an external database. The authentication process in step 302 might entail instantiating a session, and the first device fingerprint may be stored in a manner which associates the first device fingerprint with the session. A validity period might be determined for the first device fingerprint, and the first device fingerprint might be deleted from storage after the validity period.

In step 304, the computing device 101 may grant access to the user device 107 by sending, to the user device 107, a token. This process may be the same or similar as step 204 of FIG. 2.

In step 305, the unauthorized device 109 may monitor the transmission of the token in step 304. This step may be the same as the monitoring described in step 204 of FIG. 2. With that said, as will be described in further detail below, this monitoring will be ineffective for the purposes of a man-in-the-middle attack thanks to the improvements described herein.

Discussion will now turn to the second part 313b of the message diagram 300, where the user device 107, now authorized, is provided access to content. This is a desirable outcome: the user device 107, which provided valid authentication credentials and now has a valid token, is provided access to content.

In step 306, the user device 107 may send a token (e.g., the token received as part of step 304) and a second device fingerprint to the computing device 101. The second device fingerprint may be, but need not be, the same as the first device fingerprint discussed with respect to step 301. Changes in the user device 107 (e.g., changes in operating parameters of the user device 107, an operating system executing on the user device 107, a location of the user device 107, a number of programs executing on the user device 107) may cause the second device fingerprint to be different from the first device fingerprint, even though the user device 107 is validly authorized to access content. An example of such differences is provided below with respect to FIG. 4 and FIG. 6.

In step 307, the computing device 101 may authenticate the user device 107 based on the token and the second device fingerprint. This process may be the same or similar as step 302, though the user device 107 might be authenticated based on the token (rather than the authentication credentials, as was the case in step 302), as well as in view of any differences between the first device fingerprint and the second device fingerprint. This authentication process may additionally and/or alternatively comprise decrypting the second device fingerprint (e.g., if the second device fingerprint has been encrypted using a private key stored by the user device 107, and if the computing device 101 has received a corresponding public key which may be used to decrypt the second device fingerprint).

As part of authenticating the user device 107 in step 307, the computing device 101 may compare differences between the second device fingerprint (e.g., received in step 306) and the first device fingerprint (e.g., received in step 301). As indicated above, the differences might be permissible. For example, one or more differences between the second device fingerprint and the first device fingerprint might be associated with expected changes to operating parameters of the user device 107. As another example, or more differences between the second device fingerprint and the first device fingerprint might be associated with the different times during when the fingerprints were generated. Indeed, in some circumstances, a difference in fingerprints may be a positive, as the difference may indicate that the fingerprints are legitimately generated, rather than repeated without expected changes.

In step 308, the computing device may, based on authenticating the computing device in step 307, transmit content to the user device 107. This step may be the same or similar as step 208 of FIG. 2.

Discussion will now turn to part 3 of the message diagram 300, which is an example of how device fingerprints may operate to prevent replay attacks of the type depicted in FIG. 2. In particular, part 3 of the message diagram 300 indicates how the unauthorized device 109 may be prevented from authenticating with the computing device 101, even if it has a valid token, because the unauthorized device 109 does not present a valid device fingerprint.

In step 309, the unauthorized computing device may store the authentication credentials and the first device fingerprint transmitted in step 301. This step may be the same or similar as step 205 of FIG. 2.

In step 310, the unauthorized computing device may send a replay attack to the computing device 101. This step may be the same or similar as step 206 of FIG. 2. The replay attack may include the token monitored in step 305.

The replay attack may additionally and/or alternatively include a spoofed device fingerprint. For example, as part of attempting to gain unauthorized access to the computing device 101, the unauthorized device 109 may generate a spoofed device fingerprint which purports to be a device fingerprint of the user device 107. Additionally and/or alternatively, an old device fingerprint might be repeated and re-transmitted as part of the replay attack. That said, such spoofing might be made significantly more difficult through the use of device fingerprint encryption. For example, if the user device 107 is configured to use a private key to encrypt every single device fingerprint sent to the computing device 101, then the unauthorized device 109 might have a significantly harder time spoofing a fingerprint without the private key.

In step 311, the computing device 101 may determine whether to authenticate the unauthorized device 109 based on the token it received in step 310. This step may be the same or similar as step 207 of FIG. 2.

As indicated with respect to step 310, the unauthorized device 109 may have also provided a spoofed device fingerprint, and the computing device 101 may determine whether to authenticate the unauthorized device 109 based on that spoofed device fingerprint. In some circumstances, if the spoofed device fingerprint is an exact match for a previous device fingerprint received from the user device 107, the authentication may be rejected. For example, the user device 107 is configured to send a different device fingerprint with every transmission, if the computing device 101 receives the same device fingerprint twice, the computing device 101 may detect that a potential replay attack may be occurring. As another example, if the spoofed device fingerprint is significantly different than previously-received device fingerprints, authentication may be rejected.

In step 312, the computing device may, based on the authentication process in step 311, transmit a denial of access to the unauthorized device 109. Unlike the scenario depicted in FIG. 2, as shown in steps 311 and 312, the unauthorized device 109 in FIG. 3 is denied access to content. This may be because, for example, though the replay attack in step 310 might have contained a valid (but stolen) token, it did not contain a valid device fingerprint.

Discussion will now turn to focusing on the perspective of a computing device, such as the computing device 101. In particular, the discussion herein will focus on steps which may be taken by a computing device 101 to authenticate devices, particularly where the identity of such devices is not known.

Figure 4:
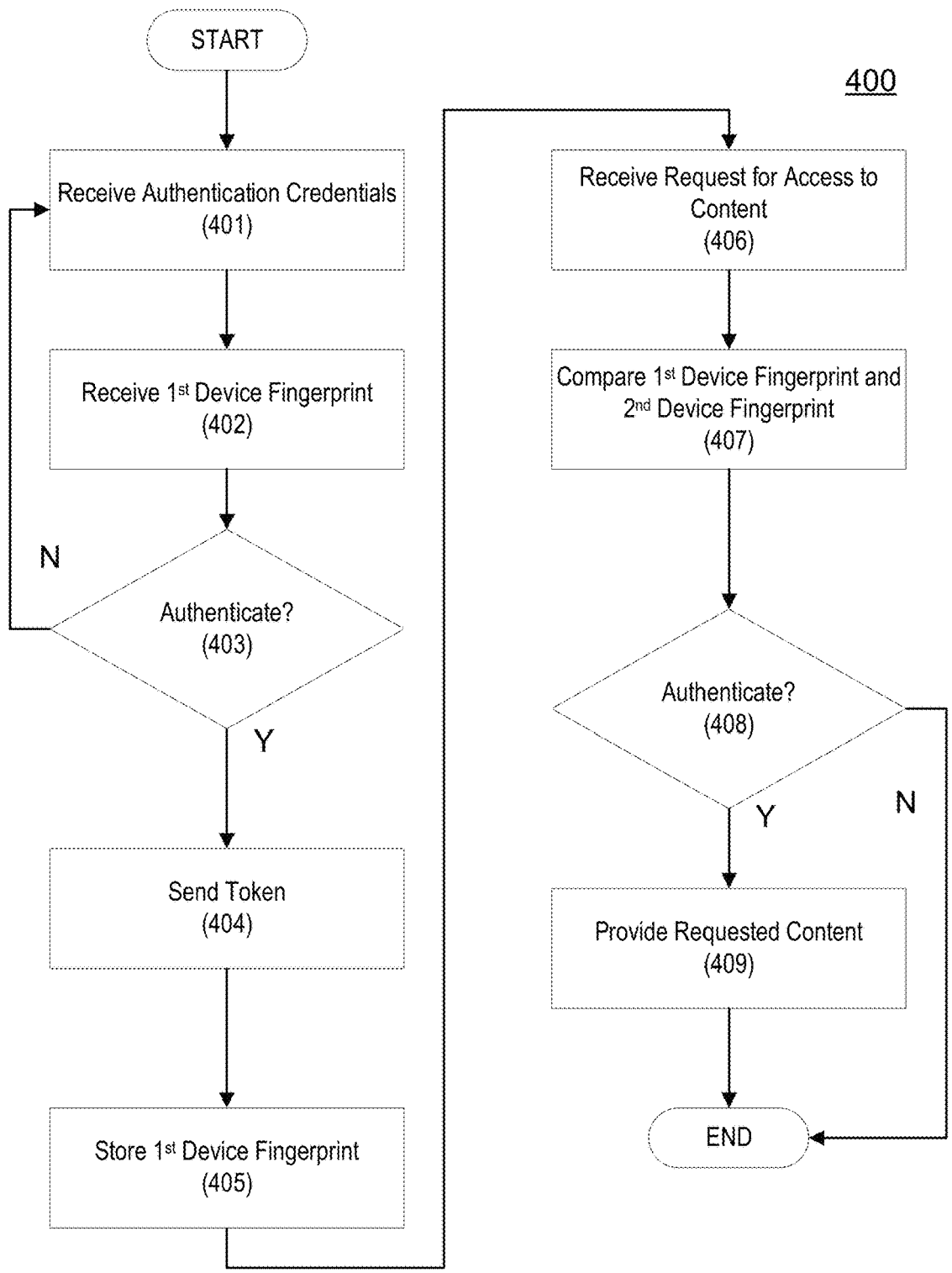
FIG. 4 depicts a flow chart for authenticating devices based on device fingerprints.

FIG. 4 depicts a flow chart which may be performed by a computing device, such as the computing device 101, to authenticate devices based on device fingerprints. The steps shown in FIG. 4 are illustrative, and may be performed in different orders. As a simple example, step 405 (which entails storing a device fingerprint) may be performed before step 404 (which entails sending a token).

In step 401, the computing device 101 may receive authentication credentials from the user device 107. This step may be the same or similar as step 201 of FIG. 2.

In step 402, the computing device 101 may receive a first device fingerprint from the user device 107. This may be the same or similar as step 301 of FIG. 3.

In step 403, the computing device 101 may determine, based on the authentication credentials and/or the first device fingerprint, whether to authenticate the user device 107. This step may be the same or similar as step 202 of FIG. 2 and/or step 302 of FIG. 3. If the computing device 101 decides to authenticate the user device 107, then the flow chart proceeds to step 404. Otherwise, the flow chart returns to step 401.

In step 404, the computing device 101 may send a token to the user device 107. This step may be the same or similar as step 203 of FIG. 2 and/or step 304 of FIG. 3.

In step 405, the computing device 101 may store the first device fingerprint received in step 402. This step may be the same or similar as step 303 of FIG. 3.

In step 406, the computing device 101 may receive a request for access to content. The request for access to content may comprise the token sent in step 404 and/or a second device fingerprint. This step may be the same or similar as step 306 of FIG. 3.

From the perspective of the computing device 101 in step 406, the computing device 101 might not know the identity of the device which sent the request for access to the content. The request may be received from the user device 107, but might also be received from the unauthorized device 109. As such, the steps taken in FIG. 4, such as steps 406-409, reflect the possibility that a replay attack may be occurring.

In step 407, the computing device 101 may compare the first device fingerprint and the second device fingerprint. Should the device fingerprints comprise a plurality of data elements, the comparison may be performed on an element-by-element basis. For example, if the first device fingerprint indicates an available memory quantity of the user device 107, then that available memory quantity may be compared to a second available memory quantity indicated by the second device fingerprint. The comparison of the first device fingerprint and the second device fingerprint may comprise decrypting, using a public key (e.g., a public key, received from the user device 107, that corresponds to a public key used by the user device 107 to encrypt the first device fingerprint), the first device fingerprint and/or the second device fingerprint before comparing the device fingerprints.

Comparison of the first device fingerprint and the second device fingerprint may comprise determining whether the first device fingerprint and the second device fingerprint are identical. That said, the first device fingerprint and the second device fingerprint being identical is not necessarily indicative that the fingerprints were received from the same computing device. For example, an unauthorized device, such as the unauthorized device 109, may conduct a replay attack by re-transmitting an old device fingerprint. That said, in other circumstances, the first device fingerprint and the second device fingerprint might be identical when sent by the same device (e.g., when both sent by the user device 107 in rapid succession with no changes made to the user device 107 in between transmissions).

Comparison of the first device fingerprint and the second device fingerprint may comprise comparing states of a computing device at different times. For example, a first device fingerprint might indicate operating parameters of a user device at a first time, and a second device fingerprint might indicate operating parameters of the same user device at a second time. As such, differences in the first device fingerprint and the second device fingerprint may in fact strengthen the conclusion that the fingerprints were received by the same device, as the differences may indicate expected changes in the operating parameters of the device over time. Accordingly, comparison of the first device fingerprint and the second device fingerprint may comprise determining that a difference between the first device fingerprint and the second device fingerprint correspond to a trend in operating parameter changes with respect to a computing device. For example, if two previous device fingerprints indicated that a device had increasingly less available memory, then subsequent device fingerprints might be expected to reflect even less available memory. With that said, sudden and/or unexpected changes in operating parameters and/or states of a computing device might indicate that the second device fingerprint may have been received by a malicious entity. For example, if two previous device fingerprints indicated that a device was using wireless communications, then a subsequent device fingerprint indicating use of a wired network might be unexpected.

Comparison of the first device fingerprint and the second device fingerprint may comprise determining whether the first device fingerprint and the second device fingerprint indicate a change in an operating parameter of a computing device. For example, the first device fingerprint and the second device fingerprint may both indicate different quantities of available memory, but the quantities may be sufficiently similar such that they suggest that they were received from the same computing device. As another example, first device fingerprint and the second device fingerprint may both indicate different locations of a mobile computing device, but the different locations may be sufficiently close such that the first device fingerprint and the second device fingerprint may have been received from the same mobile computing device.

Comparison of the first device fingerprint and the second device fingerprint may comprise determining whether the first device fingerprint and the second device fingerprint indicate the same or similar applications executing on a computing device. Device fingerprints may indicate one or more applications executing on a computing device. The comparison may comprise determining that the computing device has a same or similar set of applications executing on the computing device. Of course, as a user might open or close applications, the sets of applications indicated by the first device fingerprint and the second device fingerprint need not be identical.

Comparison of the first device fingerprint and the second device fingerprint may comprise determining whether a processing power of a user device corresponds to a cryptographic strength of a device fingerprint. User devices with relatively weak processing power may be ill-equipped to use certain forms of encryption as compared to user devices with relatively more processing power. As such, one or more encryption algorithms indicated by a device fingerprint and/or used to encrypt a device fingerprint may indicate a processing power of a user device. Changes to the encryption algorithms may indicate the possibility of a replay attack.

In step 408, the computing device 101 may determine whether to authenticate the sender of the request for access to content (as received in step 406). This step may be the same or similar as step 307 of FIG. 3. If the computing device 101 determines to authenticate the sender of the request, the flow chart proceeds to step 409. Otherwise, the flow chart ends.

Determining whether to authenticate the sender of the request for access to the content may be based on output from a machine learning model. A machine learning model may be trained using input comprising a history of device fingerprints and/or tokens, and may be configured to provide, based on the input and as output, an indication of whether or not access should be granted. For example, such training data may comprise a history of device fingerprint changes over time. Such a machine learning model may be part of machine learning software, such as the machine learning software 127. As such, determining whether to authenticate the sender of the request for access to the content may comprise providing the machine learning model input comprising the second device fingerprint, the first device fingerprint, an indication of the comparison of the first and second device fingerprints (e.g., output from step 407), and/or the token, and then receiving, from the machine learning model, an indication as to whether the sender of the request for access to the content should be granted. An example of a neural network which might execute such a machine learning model is provided below with respect to FIG. 8.

Determining whether to authenticate the sender of the request for access to the content may be based on comparing a processing power of the user device to a cryptographic strength of the second device fingerprint. As indicated above, the processing power of a user device may have an effect on its ability to use certain encryption algorithms. As such, if the first device fingerprint indicates that a user device has relatively low processing power, a second device fingerprint that has been encrypted using a particularly onerous encryption algorithm might in fact indicate that the second device fingerprint cannot be trusted.

Determining whether to authenticate the sender of the request for access to the content may be based on a security level of the content. For example, if the first device fingerprint and the second device fingerprint are found to be from the same computing device, then the requesting device might be provided unfettered access to content. In contrast, if it is unclear whether the first device fingerprint and the second device fingerprint are from the same computing device, then the requesting device might be provided access to only a limited set of content. In this manner, particularly sensitive content might be better protected, but a legitimate user might be less likely to be locked out from legitimate access to computing resources.

In step 409, the computing device 101 may provide the sender of the request for access to content (as received in step 406) access to the content. This step may be the same or similar as step 308 of FIG. 3.

Figure 5:
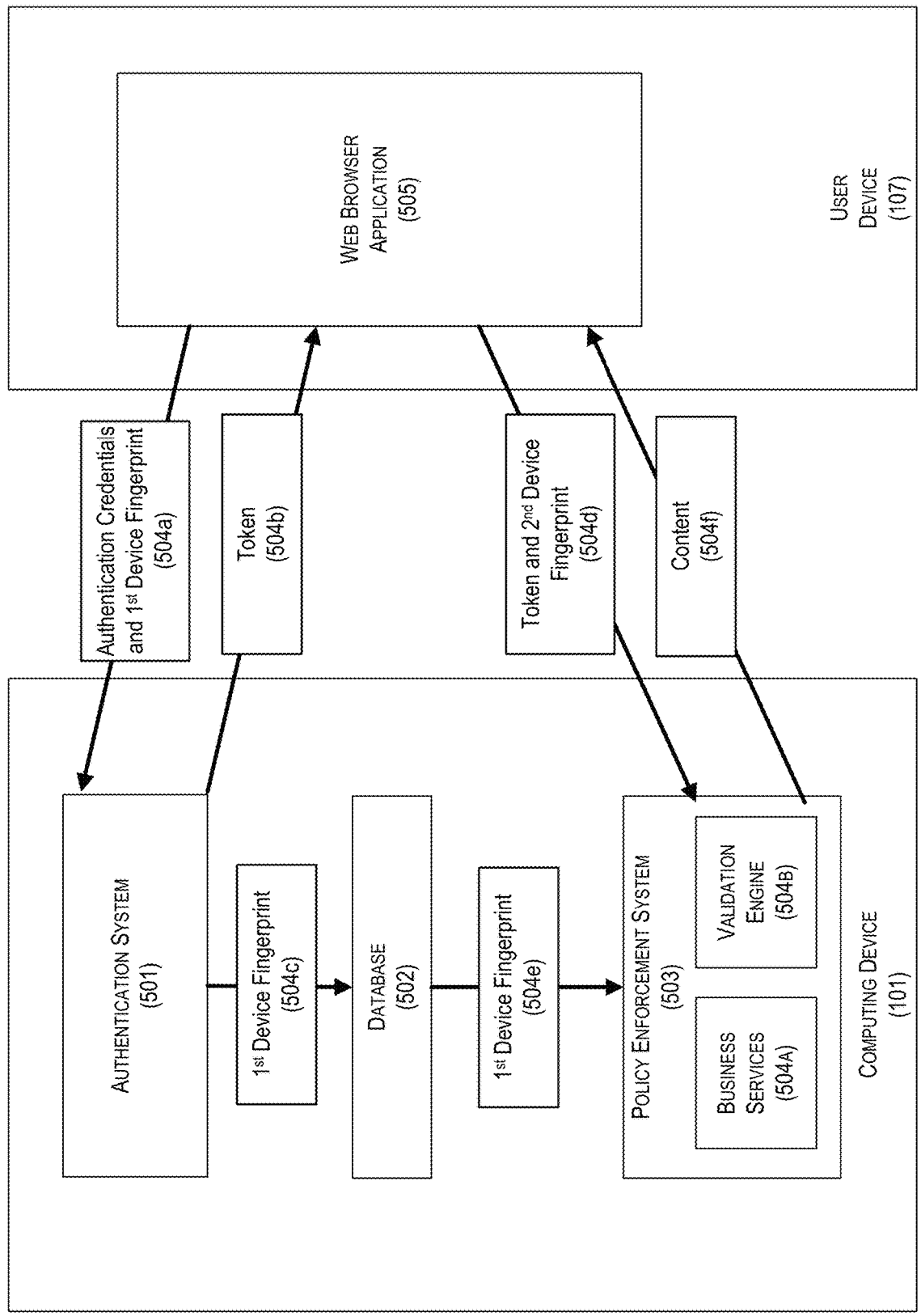
FIG. 5 depicts messaging between elements of a computing device and a user device.

FIG. 5 is a different perspective of the message flow of FIG. 3, showing in particular how a user device 107 might authenticate with a computing device 101, receive a token, then later use that token and a device fingerprint to receive content. In particular, FIG. 5 shows illustrative sub-elements of a computing device 101 and a user device 107 and how such sub-elements might operate in accordance with the disclosure herein.

The computing device 101 in FIG. 5 is shown for illustration purposes with various sub-elements, including an authentication system 501, a database 502, and a policy enforcement system 503. The authentication system 501 may be software or hardware that operates to authenticate users based on authentication data, such as a username and/or password. The database 502 may be a database in memory, such as the memory 121, which may be configured to store device fingerprints and associate those fingerprints with sessions (e.g., authenticated user sessions established by the authentication system 501). The policy enforcement system 503 may be configured with a business services module 504a and a validation engine 504b and may be configured to authenticate users based on tokens and device fingerprints. For example, the validation engine 504b may be configured with a machine learning model for evaluating received tokens and/or device fingerprints, and the business services module 504a may be configured to determine whether a successfully authenticated user is entitled to content. Such a configuration of the computing device 101 is illustrative, and the computing device 101 may be re-arranged as desired. For example, the policy enforcement system 503 and the authentication system 501 might be merged.

The user device 107 is shown with a web browser application 505. The web browser application 505 may execute on the user device 107. The web browser application 505 may be configured to, for example, access media content (e.g., television shows, movies, music), web pages (e.g., as part of websites), or the like. The web browser application 505 may be additionally configured to execute scripts, such as JavaScript code.

In step 504a of FIG. 5, the web browser application 505 may send authentication credentials and a first device fingerprint to the authentication system 501 of the computing device 101. This process may be the same or similar as step 301 of FIG. 3.

To generate the first device fingerprint sent in step 504a, the web browser application 505 executing on the user device 107 may execute a script which causes the user device 107 to generate the first device fingerprint. For example, a log in webpage associated with the computing device 101 may comprise a script that, when executed by a web browser, causes a computing device to generate a device fingerprint. Such a script may additionally and/or alternatively cause the user device 107 to generate a public/private key pair for encrypting device fingerprints. Such a script may be, for example, a JavaScript script or the like.

In step 504b of FIG. 5, the authentication system 501 of the computing device 101 may send the web browser application 505 executing on the user device 107 a token. This step may be the same or similar as step 304 of FIG. 3, and may be performed after the authentication system 501 successfully authenticates the user device 107 (as discussed with respect to step 302 of FIG. 3).

In step 504c, the authentication system 501 of the computing device 101 may cause the first device fingerprint to be stored by the database 502. In this manner, the computing device 101 may store the first device fingerprint received from the user device 107 as part of authenticating the user device 107. The first device fingerprint may be stored in a manner that associates the first device fingerprint with the token, such as by associating the first device fingerprint with a particular session.

In step 504d, the web browser application 505 may send the token and a second device fingerprint to the policy enforcement system 503 of the computing device 101. This process may be the same or similar as step 306 of FIG. 3.

In step 504e, the policy enforcement system 503 may retrieve the first device fingerprint from the database 502. The first device fingerprint may be received by querying the database 502 based on the token (e.g., a session identifier indicated by the token). In this manner, the policy enforcement system 503 may receive both the first device fingerprint (from the database 502) as well as the second device fingerprint (from the web browser application 505 executing on the user device 107).

In step 504f, the policy enforcement system 503 of the computing device 101 may send content to the web browser application 505 executing on the user device 107. This step may be the same or similar as step 308 of FIG. 3. Moreover, step 504f may be based on successful authentication of the user device 107, such as is described in step 307 of FIG. 3. The content sent to the web browser application 505 executing on the user device 107 may depend on one or more policies set by the business services module 504a. For example, the business services module 504a may maintain policies regarding what content may be received by a particular user.

Figure 6:
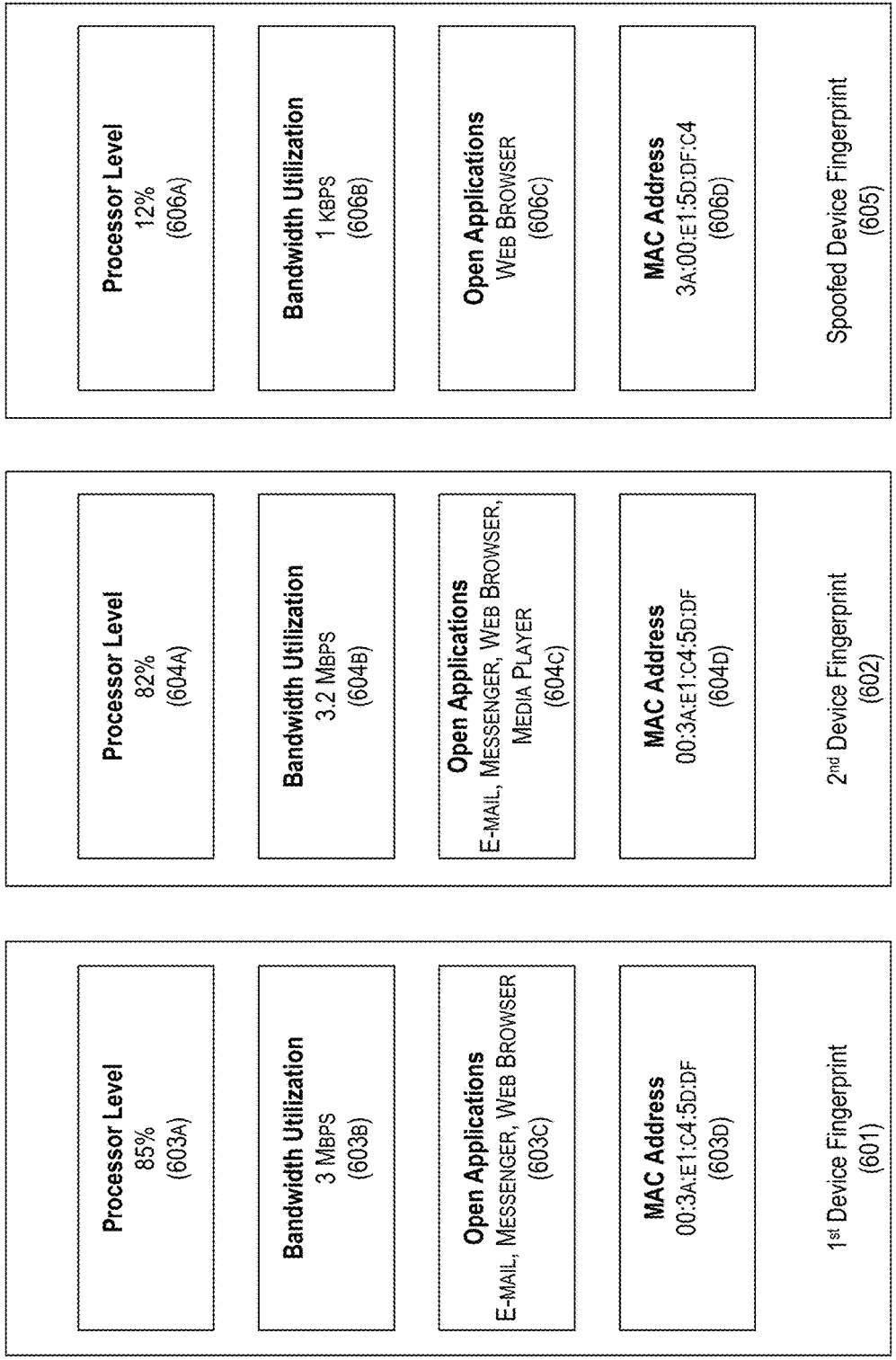
FIG. 6 depicts device fingerprints.

Discussion will now turn to an example of device fingerprints. FIG. 6 depicts two legitimate device fingerprints: a first device fingerprint 601, and a second device fingerprint 602. These legitimate device fingerprints might be presented by a user device, such as the user device 107, as part of communications, like step 301 and/or step 306 of FIG. 3. FIG. 6 also depicts a spoofed device fingerprint 605, which might be presented by an unauthorized device, such as the unauthorized device 109. Such a spoofed device fingerprint might be presented as part of a replay attack, such as is shown in step 310 of FIG. 3. Each of the device fingerprints shows different values corresponding to a processor level of a device, a bandwidth utilization of the device, applications open on (that is, executing on) the device, and a MAC address of the device. The first device fingerprint 601 shows a first processor level 603a of 85%, a first bandwidth utilization 603b of 3 Megabits per second (Mbps), a first applications list 603c that indicates three applications (e-mail, messenger, and a web browser), and a first MAC address 603d of 00:3a:e1:c4:5d:df. In contrast, the second device fingerprint 602 shows a second processor level 604a of 82%, a second bandwidth utilization 604b of 3.2 Mbps, a second applications list 604c that indicates four applications (e-mail, messenger, a web browser, and a media player), and a second MAC address 604d of 00:3a:e1:c4:5d:df. The spoofed device fingerprint 605 shows a third processor level 606a of 12%, a third bandwidth utilization 606b of 3 Kilobits per second (kbps), a third applications list 606c that indicates one application (a web browser), and a third MAC address 606d of 3a:00:e1:6d:df:c4.

Though the device fingerprints depicted in FIG. 6 are depicted in text, the device fingerprints received by a computing device (e.g., the computing device 101) might be in any format and might have more or fewer elements reflecting operating parameters of a computing device. Moreover, the fingerprints may be encrypted using a private key, such that the fingerprints might need to be decrypted using a public key.

The first device fingerprint 601, the second device fingerprint 602, and/or the spoofed device fingerprint 605 might be received by a computing device, such as the computing device 101, in quick succession. Comparison of the first device fingerprint 601 with the second device fingerprint 602 and and/or of the spoofed device fingerprint 605 (that is, the comparison process referenced in step 407 of FIG. 4) indicates numerous reasons why the second device fingerprint 602 might have originated from a legitimate computing device, whereas the spoofed device fingerprint 605 might have originated from an unauthorized computing device. For example, the first processor level 603a and the second processor level 604a are similar, whereas the third processor level 606a is significantly different (and unlikely to be the case if, for example, the spoofed device fingerprint 605 was received only a second after the first device fingerprint 601 was received). As another example, the first bandwidth utilization 603b and the second bandwidth utilization 603b are similar, but the third bandwidth utilization 606b uses different units and is significantly lower (and would unlikely to be the case if, for example, the spoofed device fingerprint 605 was received only a second after the first device fingerprint 601 was received). As another example, the first applications list 603c and the second applications list 604c are similar (though the second list indicates an additional application), but the third applications list 606c is significantly different (and would unlikely to be the case if, for example, the spoofed device fingerprint 605 was received only a second after the first device fingerprint 601 was received). As yet another example, the first MAC address 603d and the second MAC address 604d are the same, but the third MAC address 606d is different.

Discussion will now turn to example pseudocode for implementing the disclosures herein. Such code is merely provided as an example, and might require modification and adaptation based on the particularities of, for example, the authentication system in question.

FIGS. 7A-7D are illustrative pseudocode which demonstrates various aspects of the present disclosure. FIG. 7A shows illustrative code for a function that generates a fingerprint. As may be seen in the code included in FIG. 7A, the generation of the fingerprint in this instance entails generation of an RSA private key and an RSA public key. As described above, the use of such keys may aid in the overall security of the device fingerprints, in effect preventing other computing devices from generating and transmitting a fake device fingerprint. FIG. 7B shows illustrative code for functions which may be called as part of the function shown in FIG. 7A. Similarly, FIG. 7C shows illustrative code for functions which may be called as part of the function shown in FIG. 7A. The code shown in FIG. 7B and FIG. 7C is illustrative, and many of the functions depicted in these figures may be replaced with similar functions if desired. FIG. 7D shows illustrative code for a function that generates public and private keys. As indicated by the code in FIG. 7D, a SHA-256 hash is used. Though RSA public keys and private keys are used in this code, any form of public and private key pair may be used in accordance with the disclosure herein.

Figure 8:
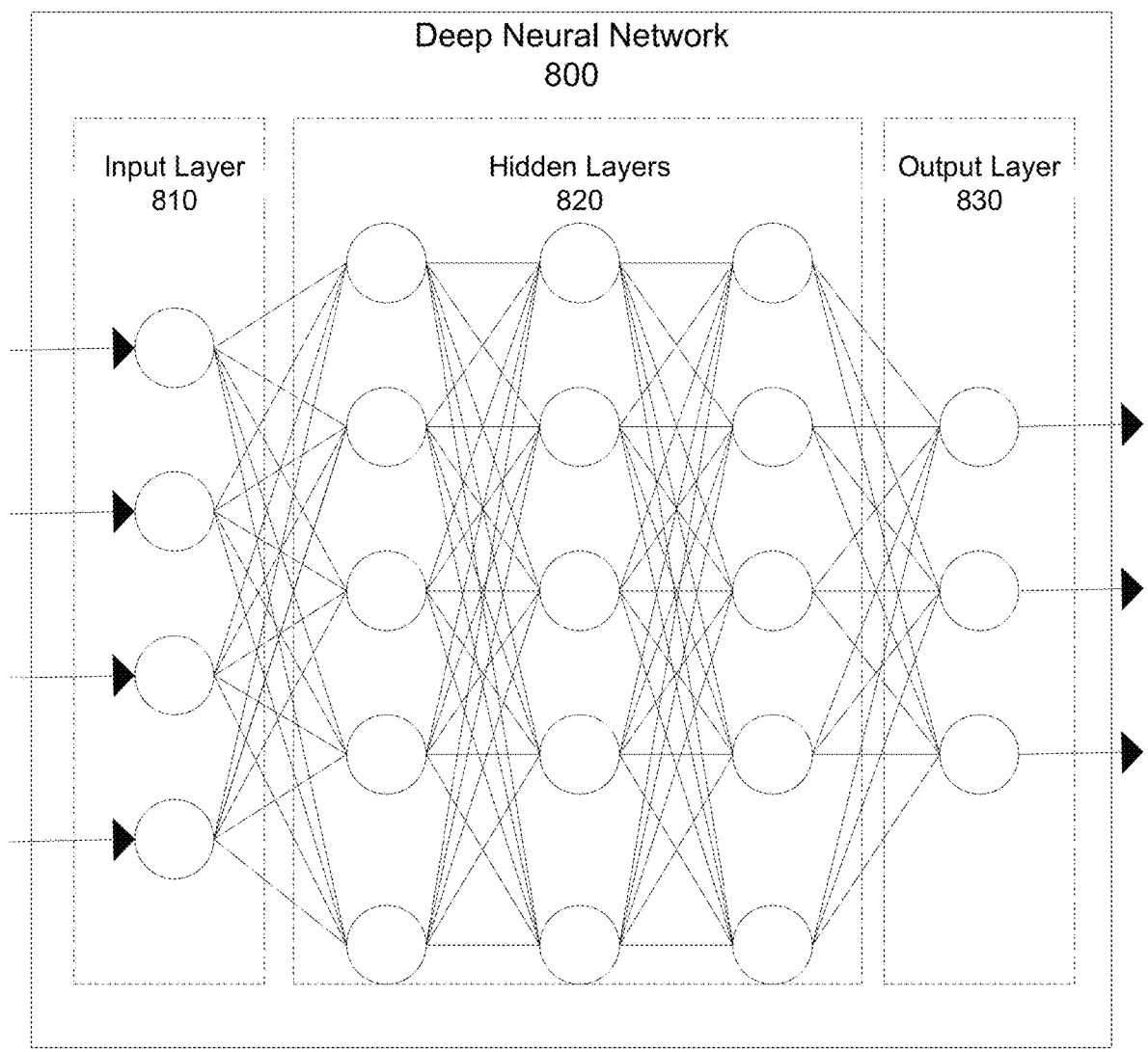
FIG. 8 depicts a neural network which may be used to implement a machine learning model.

FIG. 8 illustrates an example deep neural network architecture 800. An artificial neural network may be a collection of connected nodes, with the nodes and connections each having assigned weights used to generate predictions. Each node in the artificial neural network may receive input and generate an output signal. The output of anode in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 810, one or more hidden layers 820, and an output layer 830. A deep neural network, as used herein, may be an artificial network that has more than one hidden layer. Illustrated network architecture 800 is depicted with three hidden layers, and thus may be considered a deep neural network. The number of hidden layers employed in deep neural network 800 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a server and from a user device, authentication credentials;
receiving, from the user device, a first device fingerprint, generated at a first time, that uniquely identifies the user device and indicates each of a first plurality of applications executing on the user device at the first time;
based on authenticating the authentication credentials:
sending, to the user device, a token generated based on the authentication credentials; and
storing, in a database, the first device fingerprint;
receiving, at a second time, a request for access to content, wherein the request comprises:
the token, and
a second device fingerprint, wherein the second device fingerprint indicates each of a second plurality of applications executing at the second time;
determining that the request for access to the content was received from a second user device different from the user device by:
comparing the first device fingerprint and the second device fingerprint to determine whether, based on a difference between the first plurality of applications and the second plurality of applications, opening or closing one or more applications would result in the difference between the first plurality of applications and the second plurality of applications; and
identifying, based on determining that opening or closing one or more applications would not result in the difference between the first plurality of applications and the second plurality of applications and based on a difference between the first time and the second time, that the second plurality of applications corresponding to the second time is inconsistent with the first plurality of applications corresponding to the first time; and preventing access to the content in response to authenticating the token and determining that the request for access to the content was received from the second user device different from the user device, wherein the determining that the request for access to the content was received from the second user device different from the user device comprises determining a quantity of computing resources available to the user device.

2. The method of claim 1, wherein comparing the first device fingerprint with the second device fingerprint comprises:
determining that the difference between the first plurality of applications and the second plurality of applications indicates that one or more applications were closed.

3. The method of claim 1, wherein the determining that the request for access to the content was received from the second user device different from the user device comprises:
comparing a processing power of the user device to a cryptographic strength of the second device fingerprint.

4. The method of claim 1, wherein the determining that the request for access to the content was received from the second user device different from the user device comprises:
determining a first cryptographic strength of the first device fingerprint;
determining a second cryptographic strength of the second device fingerprint; and
determining, by comparing the first cryptographic strength and the second cryptographic strength, that the first device fingerprint and the second device fingerprint originated from different user devices.

5. The method of claim 1, further comprising:
training, using a history of device fingerprint changes, a machine learning model to detect unexpected device fingerprint changes, wherein comparing the first device fingerprint with the second device fingerprint is based on output, from the machine learning model, that is based on the second device fingerprint.

6. The method of claim 1, further comprising:
sending, to the user device, a script configured to cause the user device to generate the first device fingerprint.

7. The method of claim 1, wherein the determining that the second plurality of applications corresponding to the second time is inconsistent with the first plurality of applications corresponding to the first time comprises:
determining that the request for access to the content comprises a replay attack.

8. The method of claim 1, further comprising:
determining a security level of the content, wherein determining to prevent access to the content is based on the security level of the content.

9. The method of claim 1, further comprising:
determining a validity period for the first device fingerprint; and
deleting, after the validity period, the first device fingerprint.

10. An apparatus comprising:
one or more processors; and
memory storing instructions that, when executed by the one or more processors, cause the apparatus to:
receive, from a user device, authentication credentials;
receive, from the user device, a first device fingerprint, generated at a first time, that uniquely identifies the user device and indicates each of a first plurality of applications executing on the user device at the first time;
based on authenticating the authentication credentials:
send, to the user device, a token generated based on the authentication credentials; and
store, in a database, the first device fingerprint;
receive, at a second time, a request for access to content, wherein the request comprises:
the token, and
a second device fingerprint, wherein the second device fingerprint indicates each of a second plurality of applications executing at the second time;
determine that the request for access to the content was received from a second user device different from the user device by:
comparing the first device fingerprint and the second device fingerprint to determine that, based on a difference between the first plurality of applications and the second plurality of applications, one or more applications on the user device were closed; and
identifying, based on the determining that the one or more applications on the user device were closed and based on a difference between the first time and the second time, that the second plurality of applications corresponding to the second time is inconsistent with the first plurality of applications corresponding to the first time; and
prevent access to the content in response to authenticating the token and determining that the request for access to the content was received from the second user device different from the user device, wherein the determining that the request for access to the content was received from the second user device different from the user device comprises determining a quantity of computing resources available to the user device.

11. The apparatus of claim 10, wherein the instructions, when executed by the one or more processors, cause the apparatus to compare the first device fingerprint with the second device fingerprint by causing the apparatus to:
determine that the difference between the first plurality of applications and the second plurality of applications indicates that one or more applications were closed.

12. The apparatus of claim 10, wherein the quantity of computing resources comprises a quantity of memory.

13. The apparatus of claim 10, wherein the instructions, when executed by the one or more processors, cause the apparatus to:
train, using a history of device fingerprint changes, a machine learning model to detect unexpected device fingerprint changes, wherein comparing the first device fingerprint with the second device fingerprint is based on output, from the machine learning model, that is based on the second device fingerprint.

14. The apparatus of claim 10, wherein the instructions, when executed by the one or more processors, cause the apparatus to:
send, to the user device, a script configured to cause the user device to generate the first device fingerprint.

15. One or more non-transitory computer-readable media storing instructions that, when executed, cause:
training, using a history of device fingerprint changes, a machine learning model to detect unexpected device fingerprint changes;
receiving, by a server and from a user device, authentication credentials;
receiving, from the user device, a first device fingerprint, generated at a first time, that uniquely identifies the user device and indicates each of a first plurality of applications executing on the user device at the first time;
based on authenticating the authentication credentials:
sending, to the user device, a token generated based on the authentication credentials; and
storing, in a database, the first device fingerprint;
receiving, at a second time, a request for access to content, wherein the request comprises:
the token, and
a second device fingerprint, wherein the second device fingerprint indicates each of a second plurality of applications executing at the second time;
determining that the request for access to the content was received from a second user device different from the user device by:
comparing the first device fingerprint and the second device fingerprint to determine that, based on a difference between the first plurality of applications and the second plurality of applications, one or more applications on the user device were closed; and
identifying, using the trained machine learning model, based on the determining that the one or more applications on the user device were closed, and based on a difference between the first time and the second time, that the second plurality of applications corresponding to the second time is inconsistent with the first plurality of applications corresponding to the first time; and
preventing access to the content in response to authenticating the token and based on determining that the request for access to the content was received from the second user device different from the user device, wherein the determining that the request for access to the content was received from the second user device different from the user device comprises determining a quantity of computing resources available to the user device.

16. The non-transitory computer-readable media of claim 15, wherein the quantity of computing resources comprises a quantity of memory.

17. The non-transitory computer-readable media of claim 15, wherein the instructions, when executed, cause the determining that the request for access to the content was received from the second user device different from the user device by causing:
comparing a processing power of the user device to a cryptographic strength of the second device fingerprint.

18. The non-transitory computer-readable media of claim 15, wherein the instructions, when executed, cause the determining that the request for access to the content was received from the second user device different from the user device by determining a processing power of the user device.

19. The non-transitory computer-readable media of claim 15, wherein the instructions, when executed, cause:
sending, to the user device, a script configured to cause the user device to generate the first device fingerprint.

* * * * *